(12) United States Patent
Chen

(10) Patent No.: US 11,604,887 B2
(45) Date of Patent: Mar. 14, 2023

(54) DATA PROTECTION METHOD

(71) Applicant: Wistron Corporation, New Taipei (TW)

(72) Inventor: Yi Fen Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 80 days.

(21) Appl. No.: 17/189,281

(22) Filed: Mar. 2, 2021

(65) Prior Publication Data

US 2022/0198039 A1 Jun. 23, 2022

(30) Foreign Application Priority Data

Dec. 21, 2020 (TW) ................. 109145283

(51) Int. Cl.
| | |
|---|---|
| H04L 29/06 | (2006.01) |
| G06F 21/62 | (2013.01) |
| G06V 20/64 | (2022.01) |
| G06F 11/10 | (2006.01) |
| G06K 9/62 | (2022.01) |
| G06N 3/04 | (2023.01) |
| H03M 13/15 | (2006.01) |
| H04L 9/06 | (2006.01) |
| H04L 9/08 | (2006.01) |
| H04N 1/40 | (2006.01) |

(52) U.S. Cl.
CPC .......... G06F 21/6209 (2013.01); G06F 11/10 (2013.01); G06K 9/6232 (2013.01); G06N 3/04 (2013.01); G06V 20/64 (2022.01); H03M 13/1515 (2013.01); H04L 9/06 (2013.01); H04L 9/0863 (2013.01); H04N 1/40012 (2013.01)

(58) Field of Classification Search
CPC ..... G06F 21/6209; G06F 11/20; G06V 20/64; G06K 9/6232; G06N 3/04; H04L 9/06; H04L 9/0863; H04N 1/40012; H03M 13/1515
USPC ......................................... 713/189
See application file for complete search history.

(56) References Cited

U.S. PATENT DOCUMENTS

| | | | |
|---|---|---|---|
| 2013/0268775 A1* | 10/2013 | Hawkins | ............... H04L 9/0872 713/189 |
| 2015/0063566 A1 | 3/2015 | Arakawa et al. | |
| 2018/0096225 A1* | 4/2018 | Liu | .......................... G06T 11/20 |

(Continued)

FOREIGN PATENT DOCUMENTS

CN 105354501 2/2016

OTHER PUBLICATIONS

Joseph Redmon et al., "You Only Look Once: Unified, Real-Time Object Detection", Proceedings of the IEEE Conference on Computer Vision and Pattern Recognition (CVPR), May 9, 2016, pp. 1-10.

(Continued)

*Primary Examiner* — Evans Desrosiers
(74) *Attorney, Agent, or Firm* — JCIPRNET

(57) ABSTRACT

A data protection method is provided. The data protection method includes the following. A first image is obtained; at least one first object image in the first image is identified; the at least one first object image is analyzed to capture multiple first characteristic values of multiple characteristic points of the at least one first object image; and an encryption key is generated according to the first characteristic values.

19 Claims, 3 Drawing Sheets

(56) References Cited

U.S. PATENT DOCUMENTS

2018/0123797 A1 5/2018 Noh et al.
2020/0186350 A1* 6/2020 Wentz .................... G06F 21/62

OTHER PUBLICATIONS

"Search Report of Europe Counterpart Application", dated Oct. 18, 2021, p. 1-p. 10.
"Office Action of Taiwan Counterpart Application", dated Aug. 31, 2021, p. 1-p. 8.

* cited by examiner

DATA PROTECTION METHOD

CROSS-REFERENCE TO RELATED APPLICATION

This application claims the priority benefit of Taiwan application serial no. 109145283, filed on Dec. 21, 2020. The entirety of the above-mentioned patent application is hereby incorporated by reference herein and made a part of this specification.

BACKGROUND

Technical Field

The disclosure relates to a method, and in particular to a data protection method.

Description of Related Art

In the existing data protection technology, a confidential file is protected by a specific unlocking method. Current unlocking methods include, for example, fingerprint unlocking, face ID unlocking, pattern unlocking, voice unlocking, and password unlocking. However, there already exist methods for cracking the data protection technology described above. Therefore, currently, security protection of the confidential file may be cracked. In other words, a risk of the confidential file being leaked exists in the current data protection methods, so the current data protection methods may not provide sufficient data protection.

SUMMARY

In view of the above, the disclosure provides a data protection method that generates an encryption key adapted for encrypting a file.

The data protection method of the disclosure includes the following. A first image is obtained; at least one first object image in the first image is identified; the at least one first object image is analyzed to capture multiple first characteristic values of multiple first characteristic points of the at least one first object image; and an encryption key is generated according to the first characteristic values.

Based on the above, the data protection method of the disclosure generates the encryption key corresponding to an image captured by a user, so as to achieve data protection.

In order to present the characteristics of the disclosure in a clear manner, the embodiments are described in detail as follows in connection with the accompanying drawings.

DESCRIPTION OF THE EMBODIMENTS

Figure 1:
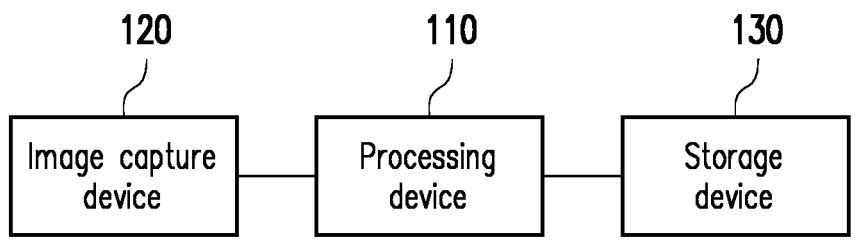
FIG. 1 is a schematic view of an electronic device according to an embodiment of the disclosure.

To present the contents of the disclosure in a clear manner, the following embodiments are given as examples based on which the disclosure may be implemented. In addition, wherever possible, the elements/components/steps denoted by the same reference numeral in the drawings and embodiments represent the same or similar parts.

FIG. 1 is a schematic view of an electronic device according to an embodiment of the disclosure. Referring to FIG. 1, an electronic device 100 includes a processing device 110, an image capture device 120, and a storage device 130. The processing device 110 is coupled to the image capture device 120 and the storage device 130. In this embodiment, the electronic device 100 may be, for example, a portable electronic device, such as a mobile phone or a tablet, and the disclosure is not limited thereto. In this embodiment, in a process of encrypting file data, a user may operate the electronic device 100 to obtain one or more real-time images through the image capture device 120. In addition, the processing device 110 may identify and analyze the one or more real-time images to obtain multiple characteristic values. In this embodiment, the processing device 110 may generate an encryption key according to the characteristic values, and perform symmetric encryption on an original file according to the encryption key to generate an encrypted file.

Correspondingly, in a process of decrypting file data, the user may operate the electronic device 100 to obtain another real-time image or other real-time images through the image capture device 120. In addition, the processing device 110 may identify and analyze said another or other real-time images to obtain other characteristic values. The processing device 110 may generate a decryption key according to said other characteristic values, and decrypt the encrypted file according to the decryption key to obtain the original file. In other words, the electronic device 100 of the disclosure may dynamically generate the encryption key according to the characteristic values of the one or more real-time images, and use the encryption key to encrypt a confidential file to generate an encrypted file that is well protected. In addition, the encryption key dynamically generated by the electronic device 100 of the disclosure is difficult to replicate and reproduce, and only a person who encrypted a file can generate a valid decryption key by capturing a correct real-time image (that is, only the person who encrypted the file knows a correct image content). Therefore, the electronic device 100 of the disclosure may provide data protection with a good protection effect.

In this embodiment, the processing device 110 may include, for example, a central processing unit (CPU), or a programmable general purpose or special purpose microprocessor, a digital signal processor (DSP), a programmable controller, an application specific integrated circuits (ASIC), a programmable logic device (PLD), other similar processing devices, or a combination of the devices described above.

In this embodiment, the image capture device 120 may include, for example, a charge coupled device (CCD) or a complementary metal-oxide semiconductor (CMOS). The image capture device 120 may be used to capture one or more real-time images, and provide the one or more real-time images to the processing device 110 for image processing and analyzing. Each of the one or more real-time images may include one or more continuous pictures.

In this embodiment, the storage device 130 may include, for example, a dynamic random access memory (DRAM), a flash memory, or a non-volatile random access memory (NVRAM), etc. The storage device 130 may be used to store software and data as described in each embodiment of the disclosure, such as a related image processing module, image analysis module, key generation module, encryption module, decryption module, encryption password data, decryption password data, file data, a related image and picture, etc. Such software and data may be provided to the processing device 110 for the processing device 110 to access and execute, so as to realize the data protection method of the disclosure.

Figure 2:
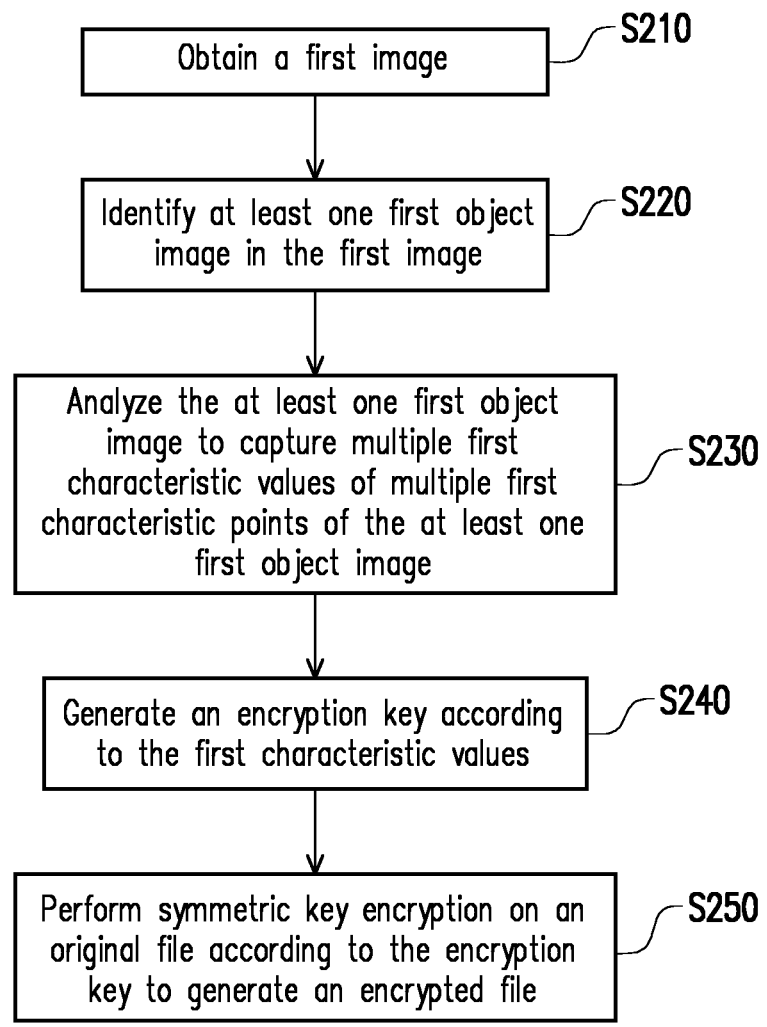
FIG. 2 is a flow chart of a data protection method according to an embodiment of the disclosure.

FIG. 2 is a flow chart of a data protection method according to an embodiment of the disclosure. Referring to FIGS. 1 and 2, the electronic device 100 may execute the following steps S210 to S250 to realize functions of generating an encryption key and data protection. In step S210, the electronic device 100 may obtain a first image through the image capture device 120. In step S220, the processing device 110 of the electronic device 100 may identify at least one first object image in the first image. In step S230, the processing device 110 of the electronic device 100 may analyze the at least one first object image to capture multiple first characteristic values of multiple first characteristic points of the at least one first object image. In step S240, the processing device 110 of the electronic device 100 may generate an encryption key according to the first characteristic values. In step S250, the processing device 110 of the electronic device 100 may perform symmetric key encryption on an original file according to the encryption key to generate an encrypted file.

Figure 3:
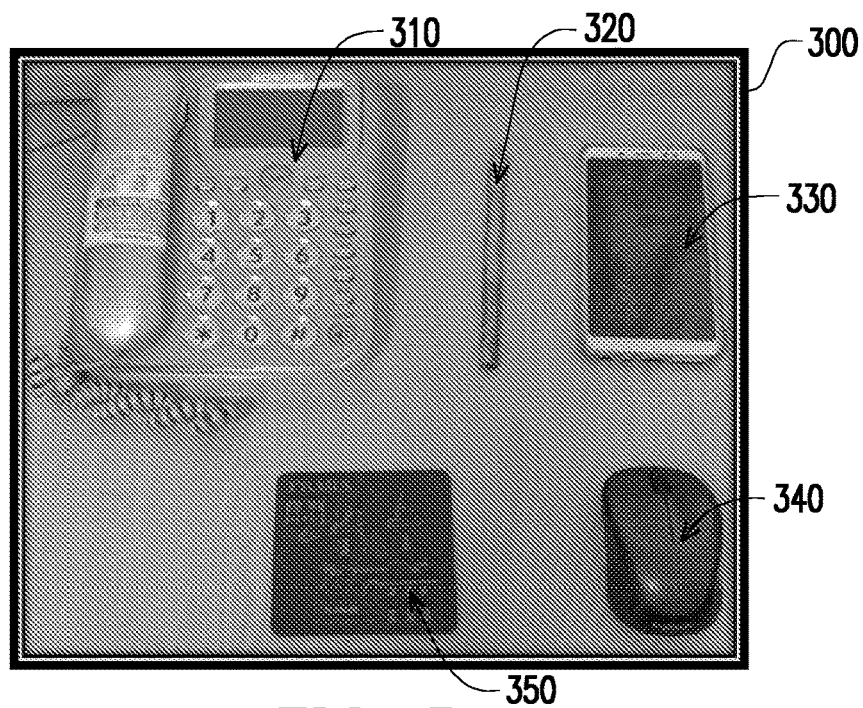
FIG. 3 is a schematic view of a first image according to an embodiment of the disclosure.
Figures 4A, 4B, 4C, 4D, 4E:
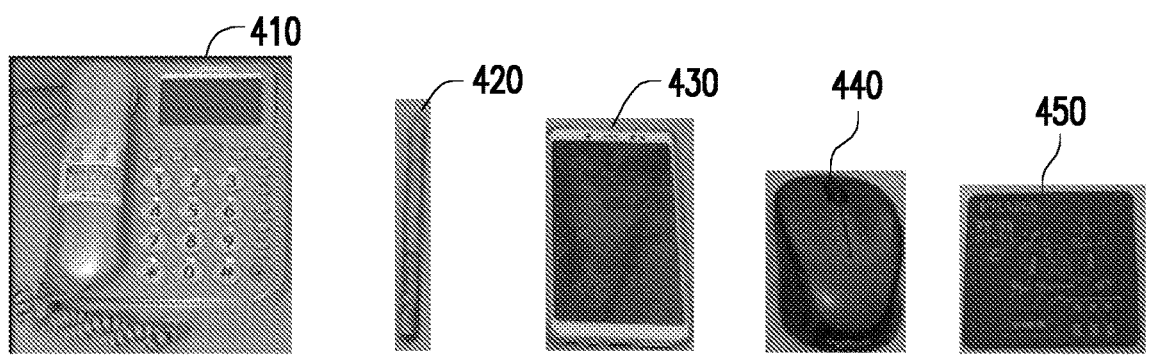
FIGS. 4A to 4E are schematic views of multiple object images according to an embodiment of the disclosure.

For example, also referring to FIG. 3, FIG. 3 is a schematic view of a first image according to an embodiment of the disclosure. In step S210 described above, when a user wants to encrypt an important file, the user may capture a first image 300 which contains multiple specific objects 310 to 350 through the image capture device 120. Alternatively, in an embodiment, the user may capture multiple (for example, three) first images 300, and obtain the specific objects 310 to 350 from the first images 300. The specific objects 310 to 350 may be, for example, a telephone, a pen, a mobile phone, a mouse, and a calculator in sequence. However, the specific objects in the first image(s) described in the disclosure are not limited to FIG. 3. The number and type of objects in the first image(s) described in the disclosure may be decided by the user.

In this embodiment, before the processing device 110 detects and identifies the objects in the first image 300, the processing device 110 may first adjust the image format of an image captured and provided by the image capture device 120. For example, the image may be converted to a preset image format and image size of a 608×608 pixel bitmap. Then, the processing device 110 may perform a grayscale conversion on the adjusted image to generate the first image 300. Lastly, the processing device 110 may use the grayscale converted first image 300 to detect and identify the following objects. In addition, the first image 300 of this embodiment may include, for example, one picture or multiple continuous pictures.

Also referring to FIGS. 4A to 4E, FIGS. 4A to 4E are schematic views of multiple object images according to an embodiment of the disclosure. In step S220 described above, the processing device 110 may identify the first object images 410 to 450 in the first image 300. In this embodiment, the processing device 110 may perform a convolutional neural network (CNN) operation on the first image 300. The processing device 110 may adopt, for example, a YOLO (you only look once) module to detect and identify objects in the first image 300. Incidentally, a feature of the YOLO module is that the CNN operation only needs to be performed on the image once to be able to determine the category and location of the objects in the image. In addition, the processing device 110 may further perform test training such as picture detection and segmentation of small objects on the YOLO module in advance, so as to increase an identification rate of small objects of the YOLO module. In addition, in an embodiment, the first object images may be determined by a user by operating the electronic device 100 to manually select object images in the first image 300.

In step S230 described above, the processing device 110 may analyze the first object images 410 to 450, respectively, to capture the first characteristic values of the first characteristic points corresponding to each of the first object images 410 to 450. The first characteristic values may be grayscale values. In this embodiment, the processing device 110 may adopt, for example, a speed up robust features (SURF) algorithm to capture the characteristic values of the first object images 410 to 450, respectively.

In an embodiment, the processing device 110 may perform a statistically optimized selection operation during a process of capturing the characteristic values. Specifically, the first image 300 may include, for example, the multiple continuous pictures, and the processing device 110 may determine multiple effective characteristic points (effective image characteristics) of each of the first object images 410-450 in the continuous pictures. The characteristic point coordinates and the characteristic values of the effective characteristic points in locations corresponding to the first object images 410 to 450 in each of the continuous pictures are the same. The processing device 110 may set the effective characteristic points as the first characteristic points. In other words, if the processing device 110 determines that a certain characteristic point does not appear in the same location of all the continuous pictures, it means that the certain characteristic point is not an effective characteristic point. In another embodiment, the processing device 110 may also set different levels in a flash light setting, sensitivity, a focal length, or an aperture of the image capture device 120 corresponding to each of the continuous pictures, so as to reduce an impact of poor ambient light, hand shaking, or failure on the imaging quality of the pictures. Therefore, the processing device 110 may avoid recording the characteristic points that have characteristics that are not obvious or the characteristic points that are mistakenly determined and captured due to an unclear image. In yet another embodiment, the processing device 110 may further filter out a picture with poor image quality automatically, so as to effectively identify the characteristic points in the image by only identifying and analyzing a picture with good image quality to facilitate key generation.

In step S240 described above, the processing device 110 may determine an encoding range of a number system as shown in table 1 below based on a total number of the characteristic points of the first characteristic points of all the first object images 410 to 450. The number system may be a binary number system.

TABLE 1

| Total number of the characteristic points | Conversion level | Value | Encoding range (binary number system) |
|---|---|---|---|
| >128 | Binary | 0~1 | 0~1 |
| 86~128 | Quaternary | 0~3 | 00~11 |
| 65~85 | Octal | 0~7 | 000~111 |
| <65 | Hexadecimal | 0~F | 0000~1111 |

Then, as shown in table 2 below, the processing device 110 may calculate an average characteristic value of the first characteristic points of all the object images. The processing device 110 may determine a percentage difference between each of the first characteristic values of the first characteristic points and the average characteristic value. In addition, the processing device 110 may determine multiple first values that comply with the number system according to the percentage differences corresponding to the first characteristic values of the first characteristic points, respectively.

TABLE 2

| Total number of the characteristic points | Percentage Difference % | Difference between values | First value (binary number system) | Percentage Difference % | Difference between values | First value (binary number system) |
|---|---|---|---|---|---|---|
| >128 | >50% | 0 | 0 | 0~50% | 1 | 1 |
| 86~128 | >75% | 0 | 00 | 51%~75% | 1 | 01 |
|  | 25%~50% | 2 | 10 | <25% | 3 | 11 |
| 65~85 | >87% | 0 | 000 | 76%~88% | 1 | 001 |
|  | 63%~75% | 2 | 010 | 51%~62% | 3 | 011 |
|  | 38%~50% | 4 | 100 | 26%~37% | 5 | 101 |
|  | 13%~25% | 6 | 110 | <12% | 7 | 111 |
| <65 | >94% | 0 | 0000 | 88%~94% | 1 | 0001 |
|  | 82%~87% | 2 | 0010 | 76%~81% | 3 | 0011 |
|  | 70%~75% | 4 | 0100 | 63%~69% | 5 | 0101 |
|  | 57%~62% | 6 | 0110 | 51%~56% | 7 | 0111 |
|  | 45%~50% | 8 | 1000 | 38%~44% | 9 | 1001 |
|  | 32%~37% | A | 1010 | 26%~31% | B | 1011 |
|  | 20%~25% | C | 1100 | 13%~19% | D | 1101 |
|  | 6%~12% | E | 1110 | <6% | F | 1111 |

Taking the total number of the characteristic points in a range of 86 to 128 as an example, as shown in Table 3, assume that the total number of the characteristic points of the first characteristic points is in a range of 86 to 128, and the characteristic values of the four characteristic points of the first characteristic points are "90," "130," "170," and "200." Therefore, as shown in Table 3, the first values corresponding to the four characteristic points are "11," "10," "01," and "00," respectively.

TABLE 3

| Total number of the characteristic points | Characteristic value | Average value | Percentage Difference | Value in the quaternary number system | First value (binary number system) |
|---|---|---|---|---|---|
| 86~128 | 90 | 100 | 10% | 3 | 11 |
|  | 130 | 100 | 30% | 2 | 10 |
|  | 170 | 100 | 70% | 1 | 01 |
|  | 200 | 100 | 100% | 0 | 00 |

Figure 5:
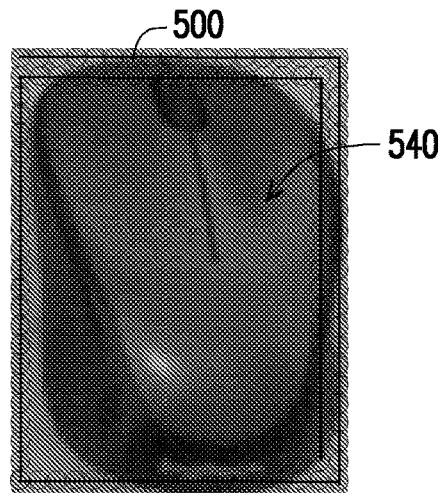
FIG. 5 is a schematic view of scanning an object image according to an embodiment of the disclosure.

Lastly, the processing device 110 may sequentially arrange the first values obtained in the embodiment described above to form an encryption key. In this regard, the processing device 110 may scan overall pixels (or at least pixels of a part of the image) of each of the first object images 410 to 450 of FIGS. 4A to 4E individually according to a preset image scanning sequence to capture the first characteristic points. Also referring to FIG. 5, FIG. 5 is a schematic view of scanning an object image according to an embodiment of the disclosure. Taking the first object image 540 as an example (that is, the image of a mouse in FIG. 4D), the processing device 110 may scan each of the pixels of the object image 540 (from outside to inside) according to a preset image scanning sequence 500. When the processing device 110 scans and finds a pixel identified as a characteristic point, the processing device 110 reads the first value corresponding to the characteristic point, such as "11." Then, if the processing device 110 reads the first value corresponding to a second characteristic point and a third characteristic point, such as "10" and "00," the processing device 110 may sequentially arrange the values to form a code "111000." Similarly, the processing device 110 may scan each of the first object images 410 to 450 in FIGS. 4A to 4E to generate a sequence of code as the encryption key.

In this embodiment, the encryption key may be 256-bit password data. In this embodiment, the processing device 110 may determine whether the first values are sufficient to form the 256-bit password data so as to determine whether to add multiple default values in sequence after the arrangement of the first values to form the 256-bit password data. In other words, if the first values are not sufficient to form 256 bits, the processing device 110 may add the default values such as "11," "01," "10," and "00" in sequence after the arrangement of the first values, but the disclosure is not limited thereto.

In addition, in an embodiment, the processing device 110 may further determine a value arrangement sequence of the first values corresponding to the first characteristic points of the first object images 410 to 450 in the encryption key according to a pixel size sequence of each of the first object images 410 to 450. In other words, the processing device 110 may determine the value arrangement sequence of the first values corresponding to each of the first object images in the encryption key according to a sequence of, for example, the first object image 410 (a phone), the first object image 450 (a calculator), the first object image 430 (a mobile phone), the first object image 440 (a mouse), and the first object image 420 (a pen).

For example, the first object image 410 (the phone) may be used to generate a code "1100" of the first values. The first object image 450 (the calculator) may be used to generate a code "1010" of the first values. The first object image 430 (the mobile phone) may be used to generate a code "1111" of the first values. The first object image 440 (the mouse) may be used to generate a code "0000" of the first values. The first object image 420 (the pen) may be used to generate a code "1000" of the first values. The processing device 110 may combine the first values corresponding to each of the object images to generate a code of the encryption key, "11001010111100001000."

It is to be noted that in the implementation scenario of generating the decryption key, since a key required for file encryption and a key required for file decryption have to be exactly the same, if image data are affected by light and shadow, shaking, or lighting, the encryption key and decryption key generated based on the image will have a greater difference, consequently the data content encrypted and data content after decryption are different. Therefore, the processing device 110 of this embodiment may further generate an error-correcting code based on the encryption key. The error-correcting code may be Reed-Solomon codes (RS codes) (RS(n, k, t)), but the disclosure is not limited thereto. In this regard, the error-correcting code may demonstrate encoding a symbol sequence with a length k into a codeword symbol sequence with a length n. Up to t erroneous symbols may be corrected, and a condition of n-k=2t is satisfied. In other words, if the encryption key is 256 bits, the format of the error-correcting code may be demonstrated as RS (308, 256, 26), and the error-correcting code allows a correction of a 10% error rate. In other words, when the difference between the encryption key and the decryption key is less than 10%, the processing device 110 may regard the decryption key as the same key as the encryption key so as to be used in file decryption. Otherwise, the decryption key is regarded as a different key and may not be used in file decryption.

In step S250 described above, the processing device 110 may, for example, use the encryption key to encrypt the original file according to the advanced encryption standard (AES) to generate the encrypted file, but the disclosure is not limited thereto. In an embodiment, the processing device 110 may also use other symmetric encryption methods to encrypt the original file.

Figure 6:
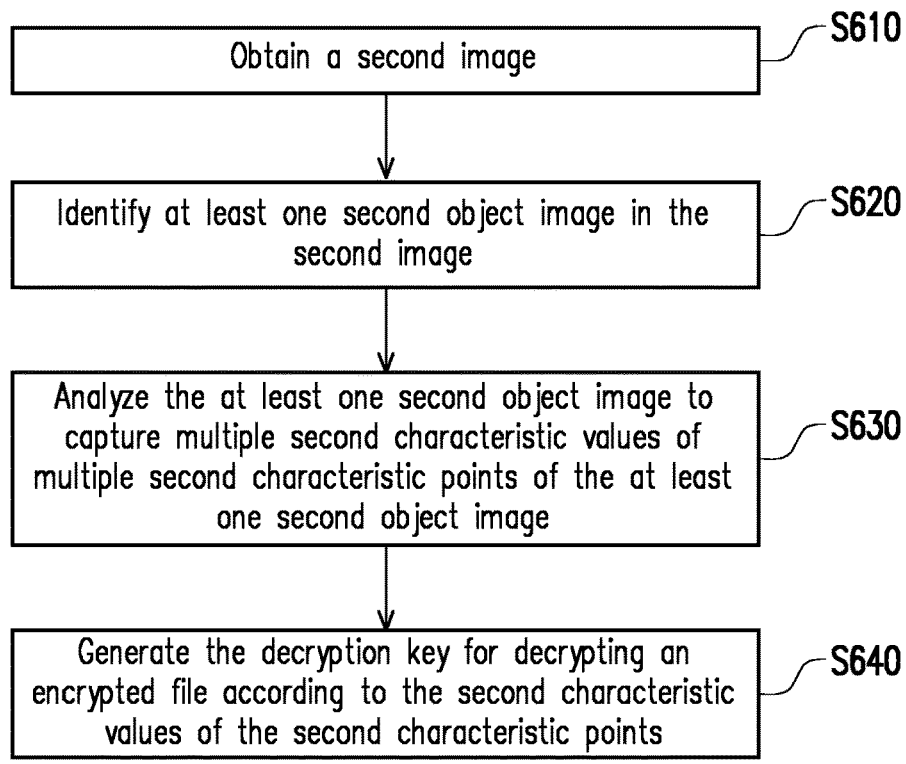
FIG. 6 is a flow chart of generating a decryption key according to an embodiment of the disclosure.

FIG. 6 is a flow chart of generating a decryption key according to an embodiment of the disclosure. Referring to FIGS. 1 and 6, in an implementation scenario where the decryption key has to be additionally generated, when a user wants to decrypt the encrypted file described in the embodiment described above, the electronic device 100 may execute the following steps S610 to S640 to generate the decryption key. In step S610, the electronic device 100 may obtain a second image through the image capture device 120. In step S620, the processing device 110 of the electronic device 100 may identify at least one second object image in the second image. In step S630, the processing device 110 of the electronic device 100 may analyze the at least one second object image to capture multiple second characteristic values of multiple second characteristic points of the at least one second object image. In step S640, the processing device 110 of the electronic device 100 may generate the decryption key according to the second characteristic values. In this embodiment, when the user wants to decrypt the encrypted file, the user may use the second image that contains the same or similar multiple object images as the first image (such as the first image 300 in FIG. 3) for generating the encryption key to generate the decryption key.

However, the encryption key of this embodiment is generated in the same way as the decryption key. The realization form and method of the second image, the at least one second object image, the second characteristic points, the second characteristic values, and the decryption key described in this embodiment may be found in the descriptions in each of the embodiments described above related to the first image, the first object image, the first characteristic points, the first characteristic values, and the generation of the encryption key in FIGS. 2 to 5, and sufficient teaching, advice, and implementation instructions may be obtained. Therefore, the details thereof are omitted herein. In addition, if the user uses the image capture device 120 to capture the objects that are the same as the specific objects 310 to 350 in FIG. 3 to obtain the second image, since the identified characteristic points of the image may have the same or similar heights, the processing device 110 may generate password data of the decryption key that are the same or very similar to the encryption key according to the second image. In other words, the processing device 110 may directly decrypt the encrypted file with the decryption key, thereby obtaining the original file.

Figure 7:
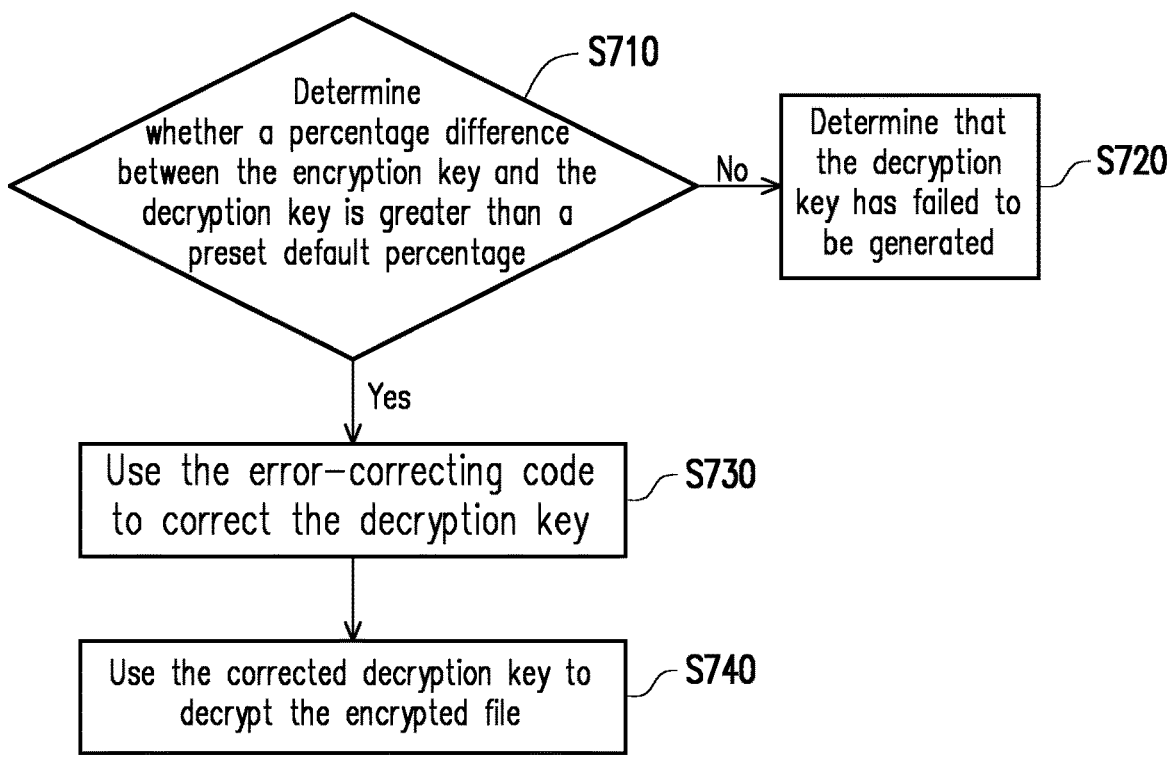
FIG. 7 is a flow chart of decrypting an encrypted file of an embodiment of the disclosure.

FIG. 7 is a flow chart of decrypting an encrypted file of an embodiment of the disclosure. However, if a user uses the image capture device 120 to capture multiple objects of the same type that are similar to (not the same as) the specific objects 310 to 350 in FIG. 3 to obtain the second image as described above, there may be an error between the password data of the decryption key generated by the processing device 110 and the password data of the encryption key. In this regard, referring to FIG. 7, the electronic device 100 may perform the following steps S710 to S740. In step S710, the processing device 110 may perform a consistency comparison between the encryption key and the decryption key to determine whether a percentage difference between the encryption key and the decryption key is greater than a default percentage. The default percentage difference is, for example, ten percent (10%), which corresponds to the allowed correction of the 10% error rate set by the error-correcting code generated in the embodiment described above. If the percentage difference between the encryption key and the decryption key is not greater than the default percentage, the processing device 110 executes step S720 to determine that the generation of decryption key has failed, and request the user to capture the image again. If the percentage difference between the encryption key and the decryption key is greater than the default percentage, the processing device 110 executes step S730 to use the error-correcting code in the embodiment described above to correct the decryption key. Then, in step S740, the processing device 110 may use the corrected decryption key to decrypt the encrypted file to obtain the original file. Therefore, when the user uses the image capture device 120 to capture multiple objects of the same type that are the same or similar to the specific objects 310 to 350 in FIG. 3 to obtain the second image described above so as to generate the decryption key, the procedure of the embodiments of FIGS. 6 and 7 may enable the electronic device 100 to generate a valid decryption key to decrypt the encrypted file.

It is to be noted that in step S710 described above, in the consistency comparison, the processing device 110 may compare each bit value of the encryption key and the decryption key in sequence (such as comparing 0 to 255 bits in sequence), for example. After the comparison, if the processing device 110 determines that a certain bit value (0 or 1) at a coding position in the encryption key and the decryption key is not the same, the processing device 110 records the number of errors thereof as 1, and accumulates a total number of errors. Therefore, the processing device 110 may calculate the percentage difference which is equal to the total number of errors divided by 256 and multiplied by 100 (the percentage difference=(the number of errors/256)×100).

In summary, the data protection method of the disclosure may generate an encryption key that is very difficult to crack through the user capturing the real-time first image that contains one or more specific object images to effectively encrypt the original file to generate the corresponding encrypted file. In addition, the data protection method of the disclosure requires the user to capture one or more specific objects that are the same or similar to those in the first image in the process of decrypting the encrypted file to obtain the second image that is the same as or highly similar to the first image so as to generate the decryption key that is similar to the encryption key. Accordingly, the encrypted file may be successfully unlocked. Therefore, the data protection method of the disclosure may provide file data protection with high protection level.

Although the disclosure has been disclosed as above through the embodiments, the embodiments are not used to limit the disclosure. Those with general knowledge in the field may make some changes and modifications within the spirit and scope of the disclosure. Therefore, the scope of the disclosure shall be subject to the claims attached hereafter.

What is claimed is:

1. A data protection method, comprising:
   obtaining a first image;
   identifying at least one first object image in the first image;
   analyzing the at least one first object image to capture a plurality of first characteristic values of a plurality of first characteristic points of the at least one first object image;
   generating an encryption key according to the first characteristic values; and
   determining a value arrangement sequence in the encryption key according to a pixel size sequence of the at least one first object image.

2. The data protection method according to claim 1, wherein the first image comprises a plurality of continuous pictures, and capturing the first characteristic values of the first characteristic points of the at least one first object image comprises:
   determining a plurality of effective characteristic points of the at least one first object image in the continuous pictures, wherein the effective characteristic points have the same characteristic point coordinates and the same characteristic values in a location of the continuous pictures respectively corresponding to the at least one first object image; and
   setting the effective characteristic points as the first characteristic points of the at least one first object image.

3. The data protection method according to claim 1, wherein capturing the first characteristic values of the first characteristic points of the at least one first object image comprises:
   determining the first characteristic points in the at least one first object image; and
   scanning an overall pixel of each of the at least one first object image according to a preset image scanning sequence to capture the first characteristic points.

4. The data protection method according to claim 1, wherein before identifying the at least one first object image in the first image, the data protection method comprises:
   converting the first image to a preset image format; and
   performing a grayscale conversion on the adjusted first image to use the grayscale converted first image to identify the at least one first object image.

5. The data protection method according to claim 4, wherein converting the first image to the preset image format comprises:
   converting the first image to a bitmap image.

6. The data protection method according to claim 4, wherein the first characteristic values are a plurality of grayscale values.

7. The data protection method according to claim 4, wherein analyzing the at least one first object image comprises:
   analyzing the at least one first object image according to a speed up robust features (SURF) algorithm to capture the first characteristic values of the first characteristic points of the at least one first object image.

8. The data protection method according to claim 1, wherein identifying the at least one first object image in the first image comprises:
   performing a convolutional neural network (CNN) operation on the first image to identify the at least one first object image.

9. The data protection method according to claim 1, wherein generating the encryption key according to the first characteristic values comprises:
   determining an encoding range of a number system according to a total number of characteristic points of the first characteristic points of all the first object images;
   calculating an average characteristic value of the first characteristic points of all the first object images;
   determining a percentage difference between each of the first characteristic values of the first characteristic points and the average characteristic value;
   determining a plurality of first values that comply with the number system according to a plurality of the percentage differences of the first characteristic values corresponding to the first characteristic points, respectively; and
   arranging the first values in sequence to form the encryption key.

10. The data protection method according to claim 9, wherein the encryption key is 256-bit password data.

11. The data protection method according to claim 10, wherein generating the encryption key according to the first characteristic values of the first characteristic points further comprises:
    determining whether the first values are sufficient to form the 256-bit password data to determine whether to add a plurality of default values in sequence after the arrangement of the first values to form the 256-bit password data.

12. The data protection method according to claim 9, wherein the number system is a binary number system.

13. The data protection method according to claim 1, further comprising:
    generating an error-correcting code according to the encryption key.

14. The data protection method according to claim 13, wherein the error-correcting code is Reed-Solomon codes (RS codes).

15. The data protection method according to claim 1, further comprising:
performing symmetric key encryption on an original file according to the encryption key to generate an encrypted file.

16. The data protection method according to claim 15, comprising:
obtaining a second image;
identifying at least one second object image in the second image;
analyzing the at least one second object image to capture a plurality of second characteristic points of the at least one second object image; and
generating a decryption key adapted for decrypting the encrypted file according to a plurality of second characteristic values of the second characteristic points.

17. The data protection method according to claim 16, further comprising:
performing a consistency comparison between the encryption key and the decryption key;
determining that generation of the decryption key has failed when a percentage difference between the encryption key and the decryption key is greater than a default percentage; and
determining that the generation of the decryption key has been successful when the percentage difference between the encryption key and the decryption key is less than or equal to the default percentage.

18. The data protection method according to claim 17, wherein the percentage difference is 10%.

19. The data protection method according to claim 17, wherein after determining that the decryption key has been successfully generated, the data protection method further comprises:
using an error-correcting code to correct the decryption key; and
using the corrected decryption key to decrypt the encrypted file.

* * * * *